Feb. 20, 1951 J. H. STARK 2,542,722
SPEED SCREW
Filed Dec. 3, 1949

Inventor:
Julian H. Stark,
by Ernest C. Britton
His Attorney.

Patented Feb. 20, 1951

2,542,722

UNITED STATES PATENT OFFICE 2,542,722

SPEED SCREW

Julian H. Stark, Fort Wayne, Ind., assignor to General Electric Company, a corporation of New York Application December 3, 1949, Serial No. 131,019

2 Claims. (Cl. 171—324)

This invention relates to a brush holder assembly for internally threaded brush holders for direct current machinery, and more particularly, the invention relates to a flexible disc or speed screw for a brush holder assembly having edge portions which are adapted to engage the threads of a brush tube or holder.

By speed screw I mean a thin, flexible, disc that may be inserted in the threaded end of a brush holder and quickly threaded into place by a twist of a screwdriver. These speed screws will take the place of the heavy, expensive, threaded brass caps now in general use. In accordance with this invention, the inexpensive speed screw discs are made from flexible material. The discs may be of any convenient configuration, i. e., circular, triangular and the like, and may be provided with an inwardly extending radial cut or slit, the edges of the slit being offset relative to each other to form a leading and trailing edge to accommodate a thread of said brush holder therebetween. The speed screw may also have a cap secured thereto in those cases where the threaded end of the brush holder is shallow.

It is therefore the primary object of my invention to provide a speed screw which may be quickly threaded into a brush holder.

It is another object of my invention to provide a speed screw, the edge portions of which are adapted to enter the threads of a brush holder.

A further object is to provide a thin speed screw having a leading edge for engaging the threads of a brush holder.

Another object of the invention is to provide a speed screw with a cap to facilitate easy insertion and removal.

Other objects and advantages of the invention will be apparent during the course of the following discussion.

For purposes of illustration, but not of limitation, an embodiment of the invention is shown on the accompanying drawing in which.

Figure 1:
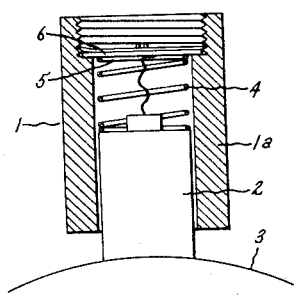
Fig. 1 is a detail cross-sectional view of a brush holder assembly.

In Fig. 1 I have shown a cross-sectional view of a brush holder assembly 1. In this assembly, a contact or brush member 2 of any suitable material, for example, carbon, is arranged for longitudinal movement in a holder 1a and is adapted to be biased longitudinally of the brush holder towards one end thereof for contact with a current collector 3 by a resilient compression coil spring 4. The spring 4 is held in compression by engagement with a spring seat 5 which engages a speed screw 6.

Figure 2:
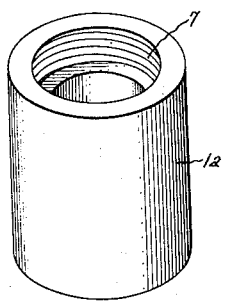
Fig. 2 is a perspective view of a threaded tube holder for receiving the speed screw.

In the drawing a brush holder 1a is shown in Fig. 2 having an internally threaded bore 7 for receiving one of my speed screws.

Figure 3:
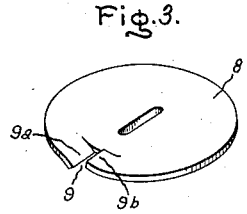
Fig. 3 is a perspective view of my flat disc speed screw showing the leading edge.

A flexible disk 8 is shown in Fig. 3 having a radially inwardly extending slit or cut 9 suitable for entering a threaded brush-holder 1a, as shown in Fig. 1. The edges of the radial cut are offset relative to each other to provide high and low points designated by numerals 9a and 9b, respectively. The member 8 is sufficiently flexible to allow its peripheral edge to flex into conformity with the pitch of the thread of said brush holder with the result that after the peripheral edge has been seated in the groove of the thread the leading edge 9a is one thread ahead of the trailing edge 9b. The leading and trailing edges 9a and 9b are thus spaced apart the distance of one screw thread.

Figure 4:
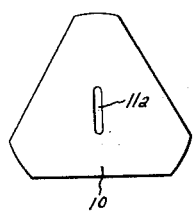
Fig. 4 is a plan view of another form of my invention.
Figure 6:
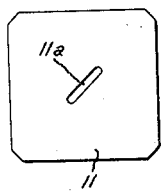
Figs. 6 and 7 are plan views of other forms of my invention.
Figure 7:
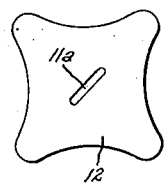
Figure 5:
Fig. 5 is an edge view of Fig. 4.

Figs. 4, 6 and 7 show various modifications of my speed screw which may be punched from flexible sheet metal. These modifications are designated by numerals 10, 11 and 12. Each of the speed screws shown is provided at its center with a slot 11a for receiving a screwdriver which may be readily inserted in the slot to rotate the speed screw into seated position in the threaded brush holder. The slots are provided with an outturned flange 11c, as shown in Fig. 5; Fig. 5 representing an edge view of Fig. 4. The speed screws, as here represented, may be inserted in the brush tube by simply pressing the speed screw with the thumb into the brush holder and then twisting the speed screw into place with a screwdriver which enters the aforementioned slot 11a in the center of the speed screw. The speed screws 10, 11 and 12 are sufficiently flexible so that the peripheral edges thereof flex into conformity with the pitch of the threads of the brush holder.

Figure 8:
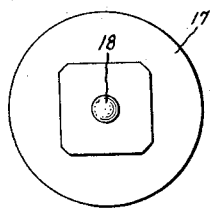
Fig. 8 is a bottom plan view of a cap with my speed screw secured thereto.
Figure 9:
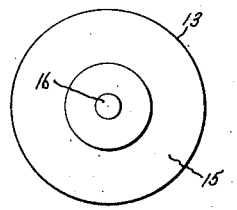
Fig. 9 is another bottom view of a cap adapted to be secured to my speed screw.
Figure 10:
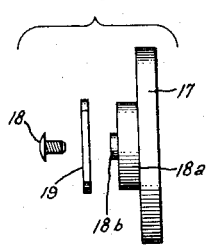
Fig. 10 is an exploded view of Fig. 8.

In Fig. 9, I have shown at 13 an insulated cap which is adapted to be secured to the flexible speed screw by any suitable means, such as by riveting. The cap is preferably made of plastic or it may be made of metal and coated with a plastic to afford proper insulation. The outer face of the cap is provided with an aperture, as shown at 14, Fig. 11. The inner face of the cap is provided with a seat 15 and a stud 16 for receiving one of my metal speed screws which is secured to the seat by welding, soldering or the cap may be secured to the speed screw by means of a driving screw which may be passed through the aperture of the disk and driven into the seat of the plastic cap. This assembly is shown in Fig. 8 wherein 17 represents the plastic cap and the numeral 18 designates the driving screw. An exploded view of this assembly is shown in Fig. 10, which shows a plastic cap 17, a seat 18a, a stud 18b, a flexible disk 19 and a driving screw 18.

Figure 11:
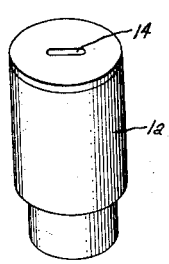
Fig. 11 is a perspective view of a brush holder with an assembled speed screw and cap.

Fig. 11 shows a brush holder 1a with the assembled speed screw and plastic cap.

The speed screw provided with the cap may be assembled in the brush holder by pushing it into the threads and giving it a turn with a screwdriver by means of the slot in the cap. In those modifications where the speed screw embodies a radial slit having offset portions to form a leading edge, the leading edge is readily insertable in the groove of a thread and will draw the rest of the edge of the disc into the groove as the disc is rotated.

All the modifications of my invention are relatively inexpensive to manufacture, as compared with the brass caps now in use and result in considerable saving, both in the cost of material and the time it takes to assemble a brush holder.

While I have illustrated and described particular embodiments of my invention, further modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States is:

1. In a brush holder assembly the combination of an internally threaded brush holder and speed screw means for retaining a brush assembly within said brush holder comprising a flexible disc having edge portions adapted to engage the threads of said brush holder, said disc being relatively thin as compared to the pitch of said threads, an insulating cap for said disc having a tool receiving recess on one of its sides, a seat portion of smaller diameter than said cap member extending from the opposite side of said cap and in concentric relation thereto and means for securing said seat portion to said disc.

2. A speed screw for retaining a brush assembly within an internally threaded brush holder, said speed screw comprising a thin flexible disc of such flexibility as to enable it to be axially pushed into said threaded brush holder, said flexible disc further having edge portions adapted to engage the threads of the brush holder, said disc being relatively thin as compared to the pitch of the threads and including a tool receiving aperture therethrough whereby said disc may be turned in the brush holder and contact the brush assembly.

JULIAN H. STARK.

REFERENCES CITED

The following references are of record in the file of this patent:

UNITED STATES PATENTS

| Number | Name | Date |
|---|---|---|
| 1,297,403 | Rydquist | Mar. 18, 1919 |
| 1,545,213 | Stuart | July 7, 1925 |
| 2,261,915 | Korte | Nov. 4, 1941 |
| 2,329,165 | Thoren | Sept. 7, 1943 |
| 2,341,304 | Wood | Feb. 8, 1944 |
| 2,401,856 | Brock | June 11, 1946 |